United States Patent
Clark

(10) Patent No.: US 7,490,254 B2
(45) Date of Patent: Feb. 10, 2009

(54) INCREASING WORKLOAD PERFORMANCE OF ONE OR MORE CORES ON MULTIPLE CORE PROCESSORS

(75) Inventor: Michael T. Clark, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 413 days.

(21) Appl. No.: 11/195,305

(22) Filed: Aug. 2, 2005

(65) Prior Publication Data

US 2007/0033425 A1 Feb. 8, 2007

(51) Int. Cl.
G06F 1/32 (2006.01)

(52) U.S. Cl. .................................... 713/320
(58) Field of Classification Search .................. 713/320
See application file for complete search history.

(56) References Cited

U.S. PATENT DOCUMENTS

| | | | | |
|---|---|---|---|---|
| 6,823,516 B1 * | 11/2004 | Cooper | .................. | 718/108 |
| 6,908,227 B2 | 6/2005 | Rusu | | |
| 7,017,060 B2 * | 3/2006 | Therien et al. | .................. | 713/323 |
| 7,100,056 B2 | 8/2006 | Barr | | |
| 7,272,732 B2 * | 9/2007 | Farkas et al. | .................. | 713/320 |
| 2006/0091061 A1 | 5/2006 | Brown | | |
| 2006/0149925 A1 | 7/2006 | Nguyen et al. | | |
| 2006/0282692 A1 | 12/2006 | Oh | | |

FOREIGN PATENT DOCUMENTS

WO 03027820 4/2003

OTHER PUBLICATIONS

Advanced Micro Devices, "AMD PowerNow! Technology" Copyright 2002.
Venkatesh Pallipadi, "Enhanced Intel SpeedStep® Technology and Demand-Based Switching on Linux".
International Search Report in Application No. PCT/US2006/028199, mailed Mar. 26, 2007.
International Preliminary Report on Patentability; Report; International Application No. PCT/US2006/028199; International Filing Date Jul. 20, 2006; Authorized Officer Charcos Llorens, V; Date of Completion of Report: Oct. 2, 2007.

* cited by examiner

Primary Examiner—Rehana Perveen
Assistant Examiner—Eric Chang
(74) Attorney, Agent, or Firm—Meyertons Hood Kivlin Kowert & Goetzel, P.C.; B. Noël Kivlin; Stephen J. Curran

(57) ABSTRACT

A processing node that is integrated onto a single integrated circuit chip includes a first processor core and a second processor core. The processing node also includes an operating system executing on either of the first processor core and the second processor core. The operating system may monitor a current utilization of the first processor core and the second processor core. The operating system may cause the first processor core to operate at performance level that is lower than a system maximum performance level and the second processor core to operate at performance level that is higher than the system maximum performance level in response to detecting the first processor core operating below a utilization threshold.

15 Claims, 2 Drawing Sheets

US 7,490,254 B2

INCREASING WORKLOAD PERFORMANCE OF ONE OR MORE CORES ON MULTIPLE CORE PROCESSORS

BACKGROUND OF THE INVENTION

1. Field of the Invention

This invention relates to multiple core processors and, more particularly, to workload performance within a multiple core processor environment.

2. Description of the Related Art

Chip multiprocessors (CMPs) are becoming increasingly popular. A CMP has two or more processor cores implemented on the same integrated circuit. CMPs may be a more efficient use of the millions of transistors that may be included on an integrated circuit than, for example, a more elaborate single processor.

In many cases, CMPs may be used to increase the computing capabilities of a system by having more than just one processor perform the central processing tasks. In addition, by sharing the processing workload in a CMP, the processing efficiency may be increased while the overall thermal and power budget may be reduced when compared to a single core processor operating at its maximum frequency.

However, some of the available processing bandwidth in some CMPs may be wasted due to thermal and power constraints that are placed on the CMP. For example, in a dual core design, both cores may be individually capable of operating at three gigahertz (GHz). However, because of the thermal budget for the package, or the power budget for the system, both processor cores may be limited to operating at 2.7 GHz.

SUMMARY

Various embodiments of a multiple-core processing node are disclosed. Broadly speaking, a processing node is contemplated in which an operating system executing on one of multiple processor cores integrated within the processing node may monitor the utilization of each of the processor cores. In response to detecting one or more of the processor cores operating below a utilization threshold, the operating system may cause the one or more processor cores to either operate in a reduced performance state or to be placed in a minimum power state as desired. In addition, the operating system may further cause the processor cores that are being utilized to operate in a performance state that is higher than a system maximum performance state.

In one embodiment, a processing node that is integrated onto a single integrated circuit chip includes a first processor core and a second processor core. The processing node includes an operating system executing on either of the first processor core and the second processor core. The operating system may be configured to monitor a current utilization of the first processor core and the second processor core. The operating system may be configured to cause the first processor core to operate at performance level that is lower than a system maximum performance level and the second processor core to operate at performance level that is higher than the system maximum performance level in response to detecting the first processor core operating below a utilization threshold.

In one specific implementation, in response to detecting a reduction in the utilization level of the first processor core below a minimum utilization threshold, the operating system may place the first processor core in a minimum power state and increase the performance level of the second processor core to a core maximum performance level. It is noted that the system maximum performance level may correspond to a maximum frequency and voltage level when both the first processor core and the second processor core are operating together and the core maximum performance level may correspond to a maximum frequency and voltage level at which each of the first processor core and the second processor core is capable of operating, when operating alone.

Figure 1:
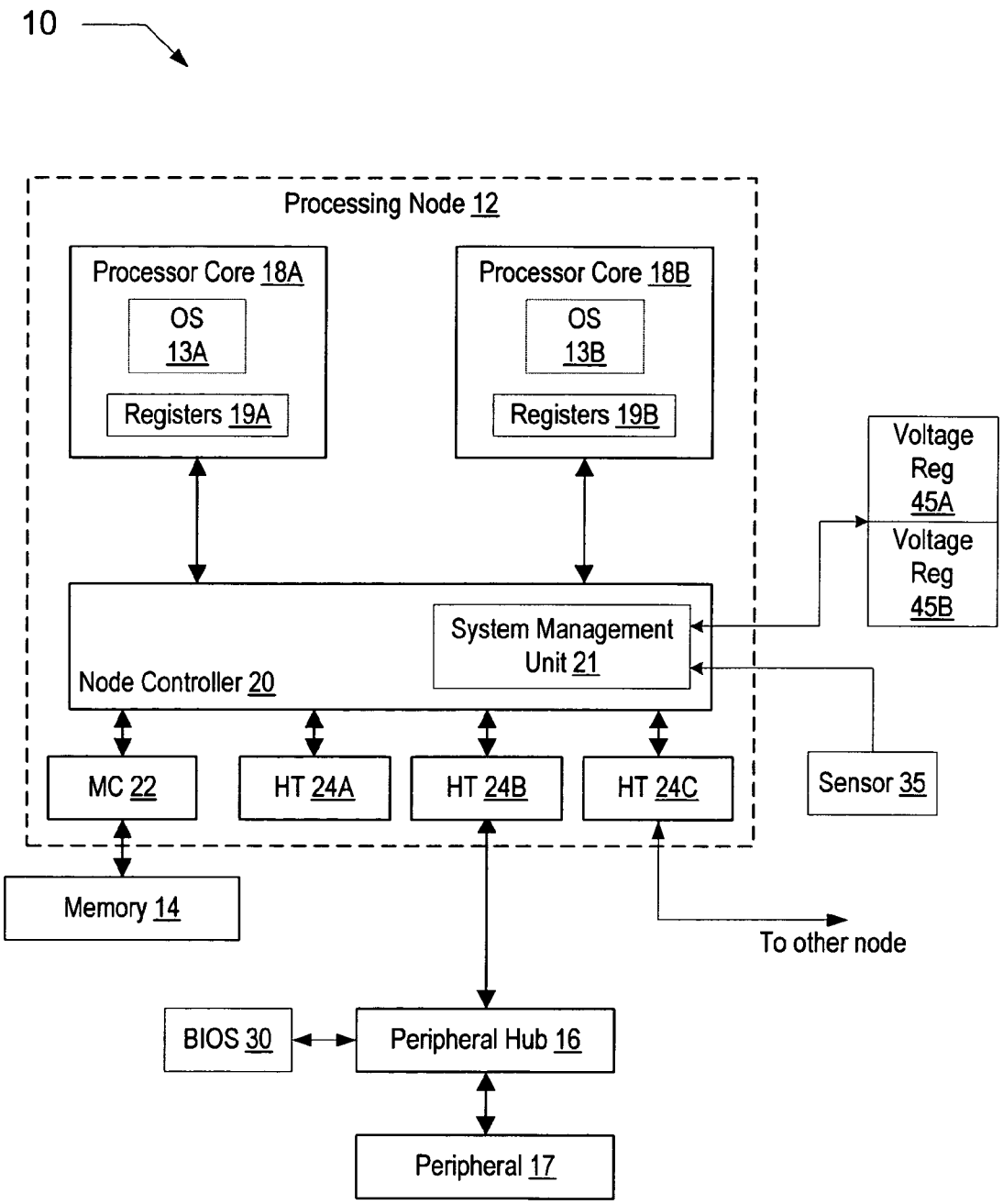
FIG. 1 is a block diagram of one embodiment of a computer system including a chip multi-processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a computer system 10 is shown. In the illustrated embodiment, computer system 10 includes processing node 12, memory 14, peripheral hub 16, peripheral device 17, sensor 35, voltage regulators 45A and 45B, and basic input/output system (BIOS) 30. The processing node 12 includes processor cores 18A-18B, which are coupled to a node controller 20, which is further coupled to a memory controller 22 and to a plurality of HyperTransport™ (HT) interface circuits 24A-24C (via an HT interface, in this embodiment). HT circuit 24B is coupled to the peripheral hub 16, which is coupled to the peripheral device 17 in a daisy-chain configuration (using HT interfaces, in this embodiment). Peripheral hub 16 is also coupled to BIOS 30. The memory controller 22 is coupled to memory 14. In one embodiment, each of the processor cores 18A-18B may include a respective cache or caches (not shown). In one embodiment, processing node 12 may be a single integrated circuit chip comprising the circuitry shown therein in FIG. 1. That is, processing node 12 may be a chip multiprocessor (CMP). Other embodiments may implement processing node 12 as two or more separate integrated circuits, as desired. Any level of integration or discrete components may be used. It is noted that in other embodiments, any number of processor cores may be used within node 12. It is further noted that components having a reference designator with both a number and a letter may be referred to by the number only where appropriate for simplicity.

Generally, processor cores 18A and 18B may each comprise circuitry that is designed to execute instructions defined in a given instruction set architecture. That is, the processor core circuitry may be configured to fetch, decode, execute, and store results of the instructions defined in the instruction set architecture. The processor cores 18 may comprise any desired configurations, including superpipelined, superscalar, or combinations thereof. Other configurations may include scalar, pipelined, non-pipelined, etc. Various embodiments may employ out of order speculative execution or in order execution. The processor core may include microcoding for one or more instructions or other functions, in combination with any of the above constructions. Various embodiments may implement a variety of other design features such as caches, translation lookaside buffers (TLBs), etc.

In one embodiment, processing node 12 may run an operating system instance that controls both processor cores 18A-18B. The OS kernel, designated as OS 13A and OS 13B, may run on either of processor cores 18A-18B, respectively. In one embodiment, one of the processor cores 18A-18B may be designated as a bootstrap core during system initialization and one processor core (possibly the same core) may be designated to run the OS kernel 13 for the node 12.

In one embodiment, each processor core 18 and OS 13 may include features and functions which enable the OS 13 to control the performance level and the power level of each processor core. For example, through the use of certain registers (e.g., registers 19A-19B) OS 13 may cause each processor core 18 to operate at one or more frequencies and/or voltage level combinations. More particularly, the Advanced Configuration and Power Interface (ACPI) specification defines power levels and performance levels for systems and system components including processors. As such, processor core frequency and voltage may be dynamically adjusted during operation to provide an efficient power and performance trade-off. For example, some application software may not be as demanding as others. Thus, the OS 13 may step the frequency and/or voltage down to provide enhanced battery life while still providing adequate performance. Similarly, to reduce power consumption during non-use, various power states are defined which enable a processor core to be effectively placed in a minimum power state (e.g., sleep). Furthermore, OS 13 may be configured to dynamically adjust the power and performance state of each processor core 18 independently, dependent upon such parameters as the utilization of each processor core 18, for example.

The node controller 20 may generally be configured to receive communications from the processor cores 18A-18B, the memory controller 22, and the HT circuits 24A-24C and to route those communications to the processor cores 18A-18B, the HT circuits 24A-24C, and the memory controller 22 dependent upon the communication type, the address in the communication, etc. In one embodiment, the node controller 20 includes a system management unit 21 that may be configured to receive system management information such as processor node temperature or other system environmental information, for example. System management unit 21 may include circuitry to provide ACPI compliant functionality. As will be described in greater detail below, the system management unit 21 within node controller 20 may be configured to notify the OS kernel 13 of certain system management events. In one embodiment, a system management message may be a request that causes processor cores 18A-18B to enter a specific state. For example, the state may be a power management state or a performance management state (such as described above). Other embodiments may define other system management messages as described below.

In the illustrated embodiment, sensor 35 may be any type of device used to monitor environmental conditions. For example, in one embodiment, sensor 35 may be temperature-sensing device that may be configured to determine the junction temperature of a reference diode within processing node 12. Sensor 35 may be further configured to provide an indication of the temperature to system management unit 21.

In the illustrated embodiment, voltage regulators 45A and 45B may be configured to programmably regulate and control the operating voltage supplied to processor cores 18A and 18B, respectively. For example, in one embodiment, OS kernel 13 may send a request for a change in operating voltage for either or both cores to node controller 20. Node controller 20 may send corresponding signals to voltage regulators 45A and 45B which may affect a voltage change. In such an embodiment, to allow independent voltage control of processor cores 18A and 18B, processing node 12 may include separate voltage supply pins (e.g. VDD and Gnd) for each of processor cores 18A and 18B.

Generally, the processor cores 18A-18B may use the interface(s) to the node controller 20 to communicate with other components of the computer system 10 (e.g. peripheral hub 16 and device 17, other processor cores, the memory controller 22, etc.). The interface may be designed in any desired fashion. Cache coherent communication may be defined for the interface. In one embodiment, communication on the interfaces between the node controller 20 and the processor cores 18A-18B may be in the form of packets similar to those used on the HT interfaces. In other embodiments, any desired communication may be used (e.g. transactions on a bus interface, packets in a different form, etc.). In other embodiments, the processor cores 18A-18B may share an interface to the node controller 20 (e.g. a shared bus interface).

The memory 14 may comprise any suitable memory devices. For example, a memory 14 may comprise one or more RAMBUS DRAMs (RDRAMs), synchronous DRAMs (SDRAMs), double data rate (DDR) SDRAM, static RAM, etc. The address space of the computer system 10 may be divided among memory 14 and any similar memory of other processing nodes (not shown). In such cases, each node 12 may include a memory map (e.g. in the node controller 20) to determine which addresses are mapped to which memory 14, and hence to which node 12 a memory request for a particular address should be routed. The memory controller 22 may comprise control circuitry for interfacing to the memories 14. Additionally, the memory controller 22 may include request queues for queuing memory requests, etc.

The HT circuits 24A-24C may comprise a variety of buffers and control circuitry for receiving packets from an HT link and for transmitting packets upon an HT link. The HT interface comprises unidirectional links for transmitting packets. Each HT circuit 24A-24C may be coupled to two such links (one for transmitting and one for receiving). A given HT interface may be operated in a cache coherent fashion (e.g. between two nodes 12) or in a non-coherent fashion (e.g. to/from peripheral hubs/devices 16 and 17). In the illustrated embodiment, the HT circuit 24C may be are coupled via coherent HT links to a similar HT interface on another node (not shown) for communicating between the nodes. The HT circuits 24A is not in use, and the HT circuit 24B is coupled via non-coherent links to the peripheral hub/devices 16 and 17.

The peripheral hub 16 and peripheral device 17 may be any type of peripheral devices. For example, the peripheral hub/devices 16 and 17 may include devices for communicating with another computer system to which the devices may be coupled (e.g. network interface cards, circuitry implementing network interface functionality that is integrated onto a computer system's main circuit board, or modems). Furthermore, the peripheral hub/devices 16 and 17 may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "peripheral device" is intended to encompass input/output (I/O) devices.

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g. peripheral component interconnect (PCI), PCI express, etc.), etc.

As described above, OS kernel 13 may run on either of processor cores 18A-18B. OS kernel 13 may monitor and control system functions, determine and allocate which processor core 18 is to run a particular execution thread, and so forth. More particularly, OS kernel 13 may monitor the utilization of each of processor core 18A-18B. In addition, dependent upon the utilization of each processor core 18A-18B and other system parameters, OS kernel 13 may independently control both the power state and the performance state of each processor core 18A-18B.

Figure 2:
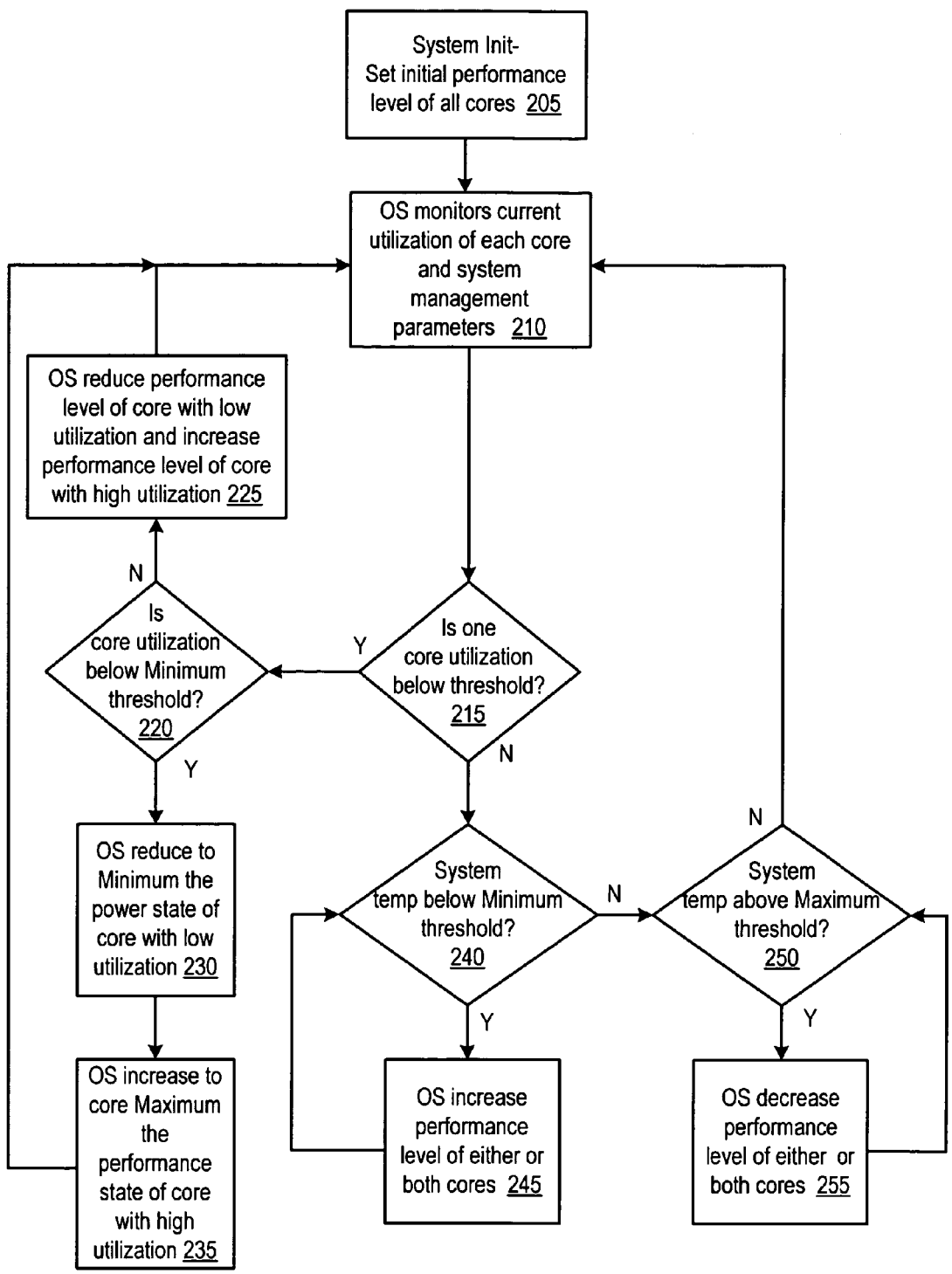
FIG. 2 is a flow diagram describing operation of one embodiment of the processing node shown in FIG. 1.

In FIG. 2, a flow diagram illustrating the operation of one embodiment of processing node 12 of FIG. 1 is shown. Referring collectively to FIG. 1 and FIG. 2 during a system initialization, an initial performance level and power level may be used to run processing cores 18A-18B (block 205). The initial settings may be default settings that are written to registers 19A-19B, for example. In one embodiment, registers 19A-19B may be model specific registers (MSR), although any register may be used. The default settings may be hard coded via fuses or they may be written via the BIOS during start-up or during a power-on self-test (POST) routine, for example. In either case, the OS 13 may use the values stored in registers 19A and 19B to determine the operating frequency, voltage and power state for each processor core 18A-18B. The initial or default settings may be predetermined values based upon system analysis. For example, the frequency and voltage settings may be set for a system maximum performance level. The system maximum performance level may correspond to a frequency and voltage level at which both processor cores 18A-18B may operate together without exceeding the thermal budget for processing node 12. The system maximum performance level is typically different than a core maximum performance level, which corresponds to the frequency and voltage level at which a given processor core 18 may be capable of operating. The core maximum may be determined through testing and characterization during manufacture.

In one embodiment during operation of processing node 12, OS 13 may monitor a current utilization of each processor core 18 using any available utility. In addition, OS 13 may monitor system management parameters such as, for example, whether any internal or external system management interrupts or request messages have been received (block 210).

If OS 13 determines that the utilization of either of processor cores 18A or 18B has dropped below a predetermined threshold (block 215), OS then determines whether that core has dropped below a minimum threshold (block 220), OS 13 may cause the processor core with the low utilization to be powered down or operated in a minimum power state (block 230). In addition, OS 13 may cause the processor core 18 that is being utilized to operate at a core maximum level (block 235).

To illustrate by example, assume each of processor cores 18A-18B are capable of operating at 3 kGHz irrespective of any system level or thermal requirements. Thus, the core maximum performance level of each processor core 18 is 3 GHz. However, when both processor cores 18 are in the same package, the thermal budget would be exceeded if they both operate together at 3 GHz. Thus, the system maximum performance level may be set such that the processor cores 18, when operating together may not exceed 2.6 GHz.

Now, an application may be running on processor core 18A only, and processor core 18B may be idle, such as might be the case when running a single threaded application. As such, OS 13 may power down processor core 18B and cause processor core 18A to operate at its core maximum performance level. In this way, the thermal budget may not be exceeded, and the application may be executed at a maximum performance level.

In addition, there may be cases where the utilization is not as clearly delineated between minimum and maximum. Accordingly, OS 13 may be configured to check the current utilization against various threshold values. Accordingly, OS 13 may dynamically adjust one processor core performance level down while adjusting the other processor core performance level up in varying increments, without exceeding the thermal budget. Accordingly, referring back to block 220, if OS 13 determines that the processor core is not below the minimum utilization threshold, but below some other threshold or thresholds, OS 13 may incrementally decrease the performance level of the processor core with the lower utilization and increase the performance level off the processor core with the higher utilization (block 225). Operation then proceeds as described in block 210 where OS 13 monitors the current utilization of each processor core 18.

Referring back to block 215, if OS 13 determines that neither processor core 18 is below a utilization threshold, OS 13 may determine whether the system temperature is below a minimum threshold (block 240). For example, a typical die operating temperature for the processor cores 18 may be 90 degrees C. This temperature may be monitored by sensor 35. In one embodiment, sensor 35 may detect the temperature of a reference diode within processor core 18A and/or 18B. Sensor 35 may provide signals indicative of the temperature to system management unit 21. In one embodiment, a minimum threshold may be 75 degrees C., while a maximum threshold may be 88 degrees C., for example. Accordingly, if the temperature is below the minimum threshold, OS 13 may incrementally increase one or both processor core performance levels (block 245) until the temperature is within the minimum (block 240) and maximum thresholds (block 250). The operations in blocks 240 and 245 may be iteratively performed some number of times to obtain the desired performance level and temperature. Operation proceeds as described in block 210 where OS 13 monitors the current utilization of each processor core 18.

Referring to block 250, if the temperature is above the maximum threshold (block 250). If the temperature is above the minimum threshold, OS 13 may incrementally decrease one or both processor core performance levels (block 245) until the temperature is within the minimum and maximum thresholds. However, in this upper limit case the OS 13 may increase the performance level step size to decrease the temperature as quickly as possible. Operation proceeds as described in block 210 where OS 13 monitors the current utilization of each processor core 18.

It is noted that the operating voltage may be incrementally increased and decreased in the same way as the frequency. In one embodiment, the voltage may be adjusted along with the frequency, while in another embodiment the voltage may be adjusted independent of the frequency. For example, as mentioned above, OS 13 may increase or decrease the operating voltage by sending a request to node controller 20. Node controller 20 may provide signals to voltage regulators 45A and/or 45B as necessary to increase or decrease the voltage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processing node comprising:
   a first processor core;
   a second processor core;
   wherein the first processor core and the second processor core are integrated onto a single integrated circuit chip; and
   an operating system executing on either of the first processor core and the second processor core, wherein the operating system is configured to monitor a current utilization of the first processor core and the second processor core;
   wherein the operating system is configured to cause the first processor core to operate at a performance level that is lower than a system maximum performance level and the second processor core to operate at a performance level that is higher than the system maximum performance level in response to detecting the first processor core operating below a utilization threshold.

2. The processing node as recited in claim 1, wherein in response to detecting a reduction in the utilization level of the first processor core below a minimum utilization threshold, the operating system is further configured to place the first processor core in a minimum power state and to increase the performance level of the second processor core to a core maximum performance level.

3. The processing node as recited in claim 2, wherein the core maximum performance level corresponds to a maximum frequency and voltage level at which each of the first processor core and the second processor core is capable of operating.

4. The processing node as recited in claim 1, wherein the system maximum performance level corresponds to a maximum frequency and voltage level when both the first processor core and the second processor core are operating.

5. The processing node as recited in claim 1, further comprising a node controller coupled to the first processor core and the second processor core, and configured to receive system management information corresponding to system environmental conditions.

6. The processing node as recited in claim 5, wherein the node controller is further configured to notify the operating system that system environmental condition have reached one or more predetermined thresholds.

7. The processing node as recited in claim 6, wherein the operating system is configured to independently adjust the performance level of each of the first processor core and the second processor core in response to receiving a notification from the node controller and dependent upon the current utilization of the first processor core and the second processor core.

8. The processing node as recited in claim 5, wherein the system management information includes processing node temperature information.

9. A method comprising:
   a first processor core executing instructions;
   a second processor core executing instructions;
   an operating system executing on either of the first processor core and the second processor core;
   the operating system monitoring a current utilization of the first processor core and the second processor core;
   the operating system causing the first processor core to operate at a performance level that is lower than a system maximum performance level and the second processor core to operate at a performance level that is higher than the system maximum performance level in response to detecting the first processor core operating below a utilization threshold.

10. The method as recited in claim 9, wherein in response to detecting a reduction in the utilization level of the first processor core below a minimum utilization threshold, the operating system is further configured to place the first processor core in a minimum power state and to increase the performance level of the second processor core to a core maximum performance level.

11. The method as recited in claim 10, wherein the core maximum performance level corresponds to a maximum frequency and voltage level at which each of the first processor core and the second processor core is capable of operating.

12. The method as recited in claim 9, wherein the system maximum performance level corresponds to a maximum frequency and voltage level when both the first processor core and the second processor core are operating.

13. The method as recited in claim 9, further comprising a node controller coupled to the first processor core and the second processor core, and configured to receive system management information corresponding to system environmental conditions.

14. The method as recited in claim 13, wherein the node controller is further configured to notify the operating system that system environmental condition have reached one or more predetermined thresholds.

15. The method as recited in claim 14, wherein the operating system is configured to independently adjust the performance level of each of the first processor core and the second processor core in response to receiving a notification from the node controller and dependent upon the current utilization of the first processor core and the second processor core.

* * * * *